(12) United States Patent
Toyodome et al.

(10) Patent No.: US 11,005,404 B2
(45) Date of Patent: May 11, 2021

(54) MOTOR DRIVING APPARATUS

(71) Applicant: Mitsubishi Electric Corporation, Tokyo (JP)

(72) Inventors: Shinya Toyodome, Tokyo (JP); Takashi Yamakawa, Tokyo (JP); Koichi Arisawa, Tokyo (JP); Keisuke Uemura, Tokyo (JP); Kenji Iwazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 209 days.

(21) Appl. No.: 16/329,581

(22) PCT Filed: Oct. 31, 2016

(86) PCT No.: PCT/JP2016/082201
§ 371 (c)(1),
(2) Date: Feb. 28, 2019

(87) PCT Pub. No.: WO2018/078837
PCT Pub. Date: May 3, 2018

(65) Prior Publication Data
US 2019/0245472 A1    Aug. 8, 2019

(51) Int. Cl.
*H02P 25/18*    (2006.01)
*H02P 27/04*    (2016.01)
(Continued)

(52) U.S. Cl.
CPC .............. *H02P 25/184* (2013.01); *H02P 6/28* (2016.02); *H02P 25/18* (2013.01); *H02P 27/04* (2013.01);
(Continued)

(58) Field of Classification Search
CPC .... H02P 25/184; H02P 27/04; H02P 2207/05; H02P 29/027; H02P 6/28; H02P 29/028;
(Continued)

(56) References Cited

U.S. PATENT DOCUMENTS 5,262,704 A * 11/1993 Farr ...................... H02H 7/122
318/434
2016/0285382 A1   9/2016 Ichihara

FOREIGN PATENT DOCUMENTS

JP    H06-051803 A    2/1994
JP    H11-252986 A    9/1999
(Continued)

OTHER PUBLICATIONS

International Search Report dated Jan. 24, 2017 issued in corresponding international application No. PCT/JP2016/082201 (and English translation thereof).
(Continued)

*Primary Examiner* — Antony M Paul
(74) *Attorney, Agent, or Firm* — Posz Law Group, PLC

(57) ABSTRACT

In a motor driving apparatus having an inverter for driving a motor capable of switching between a star connection and a delta connection, when currents detected by winding current detecting elements detecting currents flowing through windings become excessive, the inverter is made to stop. Moreover, inverter output currents are calculated after removing a circulating current component at the time of the delta connection, from the winding currents detected by the winding current detecting elements, and the inverter is controlled using the calculated inverter output currents. Because over-current protection is performed based on the detected values of the winding currents, it is possible to prevent demagnetization taking account oSf the circulating current. Also, the inverter control is prevented from being affected by the circulating current in the delta connection.
(Continued)

Accordingly, it is possible to reduce the number of the current detecting elements, and perform the over-current protection and control properly.

10 Claims, 12 Drawing Sheets

(51) Int. Cl.
  *H02P 6/28* (2016.01)
  *H02P 29/024* (2016.01)
(52) U.S. Cl.
  CPC ........ *H02P 29/027* (2013.01); *H02P 2205/01* (2013.01); *H02P 2207/05* (2013.01)
(58) Field of Classification Search
  CPC ...... H02P 1/00; H02P 1/04; H02P 1/46; H02P 1/12; H02P 1/16; H02P 1/24; H02P 1/26; H02P 1/52; H02P 3/00; H02P 3/04; H02P 3/06; H02P 3/18; H02P 6/00; H02P 6/12; H02P 6/187; H02P 6/24; H02P 21/00; H02P 23/00; H02P 25/00; H02P 27/00; H02P 27/06; B62D 5/0487; F25B 49/022; F25B 49/02

See application file for complete search history.

(56) References Cited

FOREIGN PATENT DOCUMENTS

| | | |
|---|---|---|
| JP | 2008-228513 A | 9/2008 |
| JP | 2010-246210 A | 10/2010 |
| JP | 5611496 B | 9/2014 |
| WO | 2015/097815 A1 | 7/2015 |

OTHER PUBLICATIONS

Office Action dated Jan. 21, 2020 issued in corresponding JP patent application No. 2018-547064 (and English tanslation).

\* cited by examiner

MOTOR DRIVING APPARATUS

CROSS REFERENCE TO RELATED APPLICATION

This application is a U.S. national stage application of International Patent Application No. PCT/JP2016/082201 filed on Oct. 31, 2016, the disclosure of which is incorporated herein by reference.

TECHNICAL FIELD

The present invention relates to a motor driving apparatus provided with an inverter. For example, the present invention relates to a motor driving apparatus in which an alternating current with a variable frequency and a variable voltage is supplied from an inverter to a permanent magnet synchronous motor to cause it to perform variable speed operation.

BACKGROUND ART

A motor driving apparatus is known which uses an inverter with a variable frequency and a variable voltage to change the rotational speed of a motor, and in which the connection state of the stator windings is switched between a star (Y) connection and a delta (Δ) connection based on the load, thereby to reduce the power consumption and improve the efficiency.

For example, in the case of an electric motor for a compressor of an air conditioner, it is contemplated to drive it with a star connection in an intermediate condition (low-load condition) whose ratio of contribution to the annual power consumption is high, and drive it with a delta connection in a rated condition (high-load condition). By doing so, it is possible to improve the efficiency in the intermediate condition, and to enable high-power output in the rated condition.

In the case of a motor using permanent magnets, the magnets are demagnetized when the currents flowing through the stator windings are excessive, so that protective measures are taken to restrain the currents flowing through the stator windings to within a permissible value.

Meanwhile, it is necessary to determine the currents output from the inverter for controlling the inverter.

If the output currents of the inverter as well as the currents of the windings are detected, the respective results of the detections can be used for the control of the inverter and for the detection of the excessive currents, respectively. However, such an arrangement increases the number of the current detectors, and the space and the cost of the current detectors are increased.

Accordingly, it is often so arranged that the currents of the inverter are detected, and are used for the control of the inverter and for the over-current protection of the windings.

In this case, it is necessary to estimate the currents flowing through the windings from the currents of the inverter. The ratio between the winding current and the inverter current differs depending on the connection state of the windings. When the detected value of the inverter current is used for the control to prevent the winding current from becoming excessive, it is necessary to take account of the difference in the above-mentioned ratio.

Specifically, when the inverter current is detected and the detected current is compared with a threshold value, it is necessary to use different threshold values depending on the connection state because the ratio between the detected current and the winding current is different depending on the connection state.

For instance, in the case of the star connection, the inverter output current and the winding current are of the same maginitude, whereas in the case of the delta connection, the inverter output current is $\sqrt{3}$ times the winding current.

Accordingly, when an inverter is controlled so as to prevent the detected value of the inverter current from exceeding a threshold value for the purpose of preventing demagnetization, the threshold value for the star connection needs to be $1/\sqrt{3}$ times the threshold value for the delta connection.

Accordingly, it has been proposed to switch the threshold value (reference value) depending on the connection state (Patent reference 1, paragraphs 0048, 0070, FIGS. 14(c), 14(d)).

It is also known to detect a bus current (input current) of the inverter and use the detected current for the control of the inverter, and also to detect the currents flowing through the windings and perform the over-current protection of the windings based on the detected currents (Patent reference 1, paragraphs 0090, FIG. 4).

PATENT REFERENCES

Patent Reference 1: Japanese Patent Publication No. 2008-228513 (Paragraphs 0042, 0090, FIGS. 4, 14(c) to 14(d))

In the configuration of FIG. 14(c) or 14(d) of Patent reference 1, a resistor in a single over-current protection circuit is short-circuited by a transistor, to alter the threshold value. A problem with this configuration is that, when a low-cost digital transistor is used as the transistor, the accuracy of the protection level is lowered because of relatively large manufacturing variations of the digital transistors. If the threshold value is set to a lower value (to provide a margin), taking account of the variations, the motor cannot be made to operate to the limit of its capacity. Transistors and resistors with smaller variations are expensive, and if such transistors and resistors are used, the over-current protection circuit becomes expensive.

Also, at the time of the delta connection, a circulating current flows through the windings, but the circulating current cannot be estimated from the inverter current. As a result, for the purpose of protection against the demagnetization, the threshold value needs to be set lower taking account of the circulating current. This is another reason why the motor cannot be made to operate to the limit of its capacity.

The configuration shown in FIG. 4 of Patent reference 1 requires, in addition to a detecting element for detecting the bus current, detecting elements for detecting the winding currents.

SUMMARY

The present invention has been made to solve the problems described above, and its object is to provide a motor driving apparatus in which the number of detecting elements required is smaller and which can properly perform protection to prevent the winding currents from becoming excessive, as well as control over the inverter.

A motor driving apparatus according to the present invention comprises:

a connection switching means for switching a connection state of windings of a motor between a star connection state and a delta connection state;

an inverter for supplying said motor with AC power, to cause said motor to operate;

a control device for causing said connection switching means to make switching of the connection state, and controlling said inverter; and one or more winding current detecting elements respectively provided for one or more of said windings, each of the winding current detecting elements detecting a current flowing through the corresponding winding;

an over-current protection circuit for causing said inverter to stop when the currents detected by said winding current detecting elements become excessive;

wherein said control device calculates output currents of said inverter after removing a circulating current component at a time of the delta connection, from the winding currents detected by said winding current detecting elements, and performing control over said inverter using the calculated inverter output currents of said inverter.

According to the present invention, the over-current protection of the windings is performed based on the detected values of the winding currents, so that it is possible to prevent demagnetization taking account of the circulating current at the time of the delta connection. It is also possible to perform control over the inverter after removing the effects of the circulating current. As a result, the number of current detecting elements can be restrained, and the over-current protection and control can be performed properly.

DETAILED DESCRIPTION

Embodiments of the present invention will now be described.

In the embodiments described below, the present invention is applied to a driving apparatus for a motor for driving a compressor of an air conditioner.

First Embodiment

Figure 1:
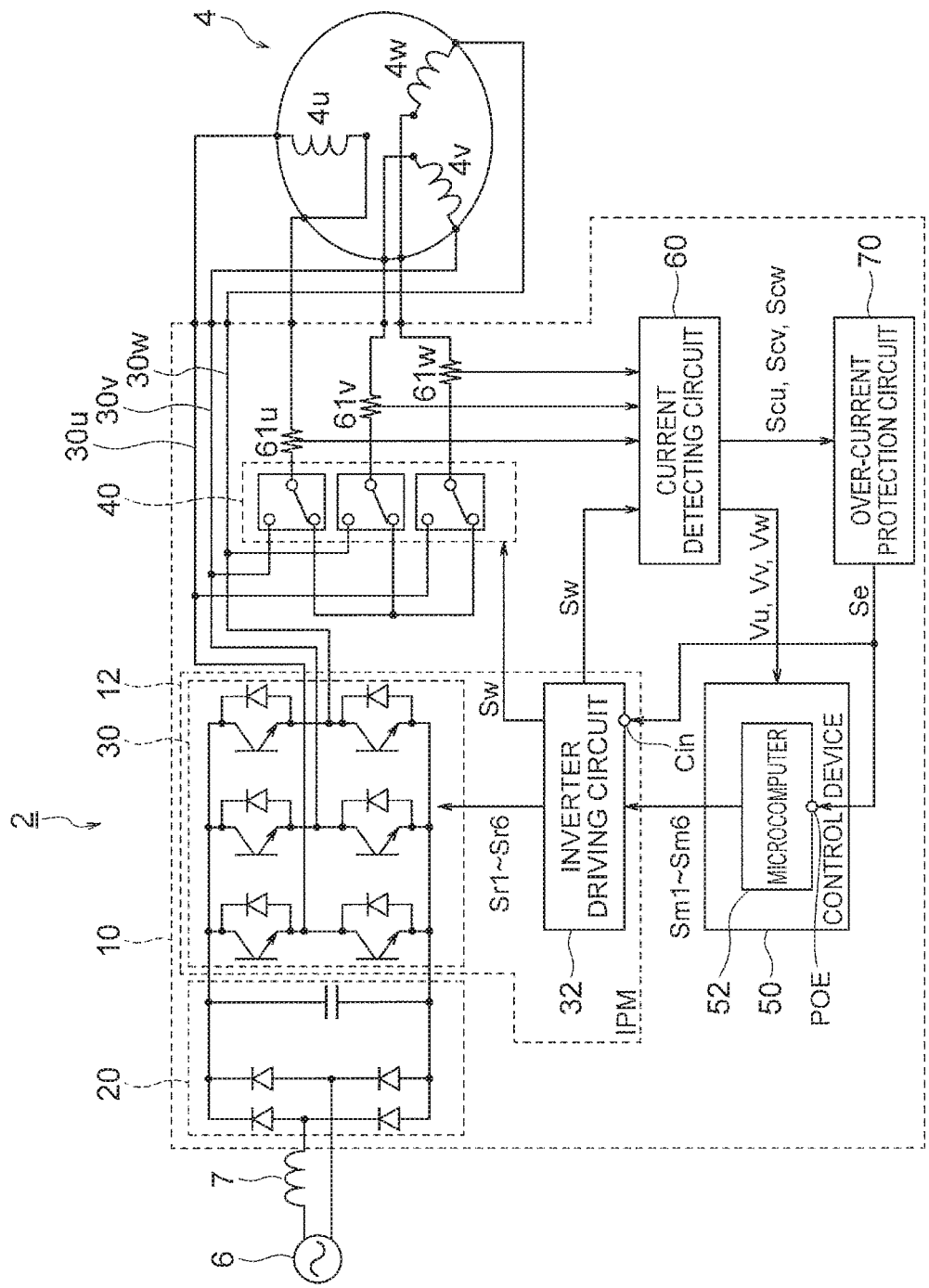
FIG. 1 is a schematic wiring diagram showing a motor driving apparatus of a first embodiment of the present invention, together with a motor.

FIG. 1 is schematic wiring diagram showing a motor driving apparatus of a first embodiment of the invention, together with a motor.

The illustrated motor driving apparatus 2 is for driving a motor 4, and includes a converter 20, an inverter 30, an inverter driving circuit 32, a connection switching means 40, a control device 50, a current detecting circuit 60, and an over-current protection circuit 70.

The combination of the inverter 30 and the inverter driving circuit 32 is configured of an IPM (intelligent power module) 12. The IPM 12, the converter 20, the connection switching means 40, the control device 50, the current detecting circuit 60, and the over-current protection circuit 70 are mounted on an inverter board 10.

The converter 20 receives AC power from an AC power source 6, via a reactor 7, and performs rectification, smoothing, and the like, to output DC power. The converter 20 serves as a DC power source which supplies DC power to the inverter 30 described next.

Input terminals of the inverter 30 are connected to output terminals of the converter 20, and output terminals of the inverter 30 are respectively connected via output lines 30u, 30v, 30w of U-phase, V-phase, and W-phase, to three-phase windings 4u, 4v, 4w of the motor 4.

The inverter 30 has switching elements in six arms which are turned on and off according to drive signals Sr1 to Sr6 from the inverter driving circuit 32, to generate three-phase AC currents and supplies the three-phase AC currents to the motor 4.

The inverter driving circuit 32 generates the drive signals Sr1 to Sr6 based on on-off control signals, e.g., PWM signals Sm1 to Sm6, to be described later, from the control device 50.

Figure 2:
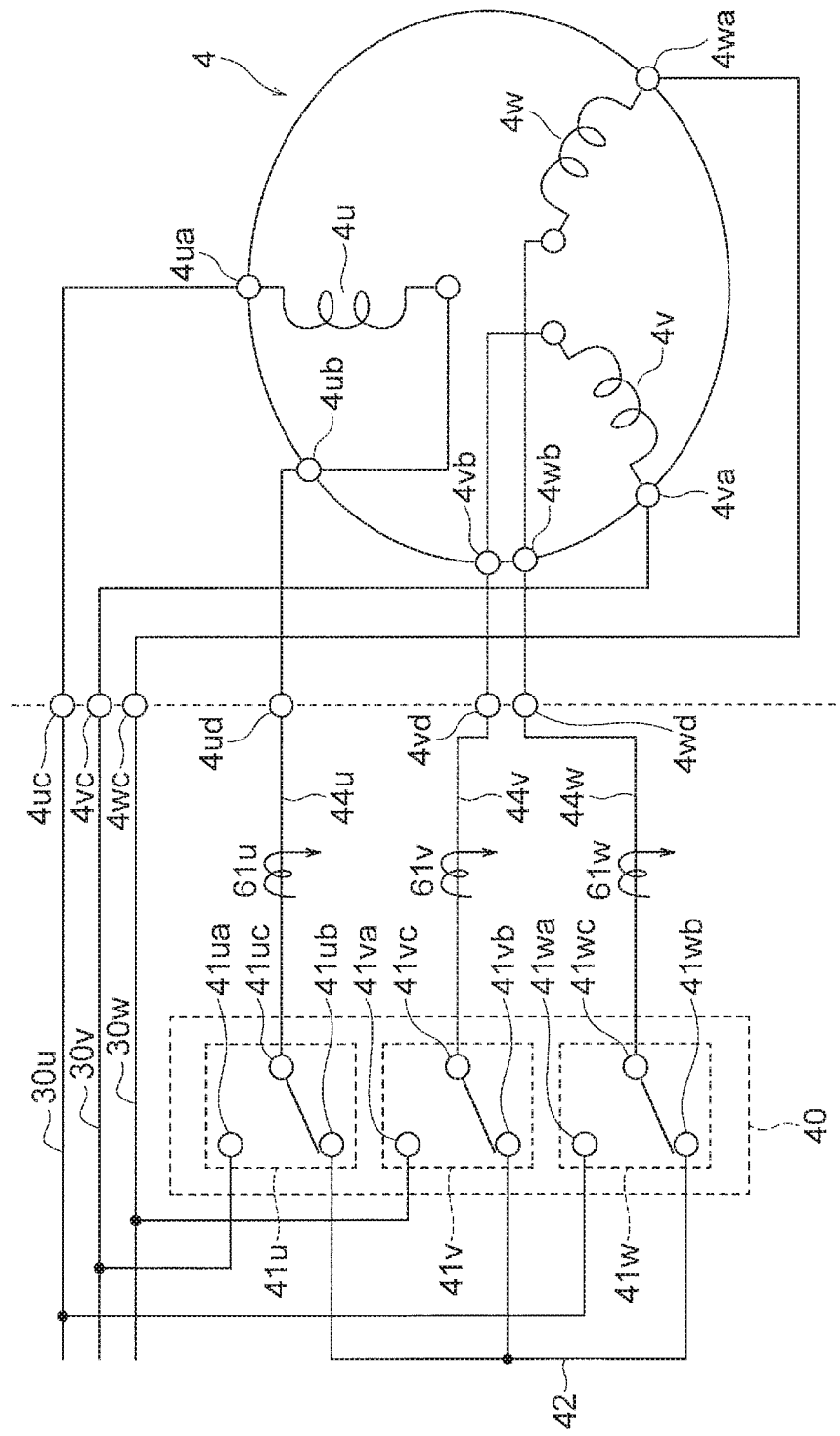
FIG. 2 is a wiring diagram showing in further detail the windings of the motor and the connection switching means in FIG. 1.

The motor 4 can assume either the star connection or the delta connection by the function of the connection switching means 40. FIG. 2 shows the windings of the motor and the connection switching means 40 in detail.

As shown, first ends 4ua, 4va, 4wa and second ends 4ub, 4vb, 4wb of the respective windings 4u, 4v, 4w of three phases, i.e., U-phase, V-phase, and W-phase, are connected to external terminals 4uc, 4vc, 4wc, 4ud, 4vd, 4wd, and are thus connectable to the outside of the motor 4. Connected to the external terminals 4uc, 4vc, 4wc are the output lines 30u, 30v, 30w of the inverter 30.

In the illustrated example, the connection switching means 40 includes three selection switches 41u, 41v, 41w. The three selection switches 41u, 41v, 41w are provided for three phases, respectively.

As the selection switches 41u, 41v, 41w, electromagnetically-driven mechanical switches are used. Such switches are also called relays, contactors, or the like, and assume different states between when a current is flowing through an excitation coil, not shown, or no current is flowing through the excitation coil.

A common contact 41uc of the selection switch 41u is connected via a lead line 44u to the terminal 4ud, a normally-closed contact 41ub is connected to a neutral point node 42, and a normally-open contact 41*ua* is connected to the V-phase output line 30*v* of the inverter 30.

A common contact 41*vc* of the selection switch 41*v* is connected via a lead line 44*v* to the terminal 4*vd*, a normally-closed contact 41*vb* is connected to the neutral point node 42, and a normally-open contact 41*va* is connected to the W-phase output line 30*w* of the inverter 30.

A common contact 41*wc* of the selection switch 41*w* is connected via a lead line 44*w* to the terminal 4*wd*, a normally-closed contact 41*wb* is connected to the neutral point node 42, and a normally-open contact 41*wa* is connected to the U-phase output line 30*u* of the inverter 30.

Normally, the selection switches 41*u*, 41*v*, 41*w* are in a state in which they are switched to the normally-closed contact side, as illustrated, that is, the common contacts 41*uc*, 41*vc*, 41*wc* are connected to the normally-closed contacts 41*ub*, 41*vb*, 41*wb*. In this state, the motor 4 is in the star connection state.

When a current flows through an excitation coil not shown, the selection switches 41*u*, 41*v*, 41*w* will be in a state, opposite to that illustrated, in which they are switched to the normally-open contact side, that is, the common contacts 41*uc*, 41*vc*, 41*wc* are connected to the normally-open contacts 41*ua*, 41*va*, 41*wa*. In this state, the motor 4 is in the delta connection state.

The control device 50 controls the connection switching means 40 to control the switching of the connection state of the motor, and performs on-off control over the inverter 30 to cause it to supply AC power to the motor 4. For the on-off control, the control device 50 generates the on-off control signals Sm1 to Sm6 and supplies them to the inverter driving circuit 32.

In the following description, it is assumed that PWM control is performed as the on-off control. When PWM control is performed, PWM signals Sm1 to Sm6 are supplied as the control signals to the inverter driving circuit 32. In this case, three-phase AC currents of a variable frequency and a variable voltage can be generated by the inverter 30. Another example of the on-off control is a rectangular wave drive control. In the rectangular wave drive control, control signals for causing a current to flow through the winding of each phase for 120 degrees are supplied. In this case, three-phase AC currents of a variable frequency can be generated by the inverter 30.

The control device 50 includes a microcomputer 52.

Figure 3:
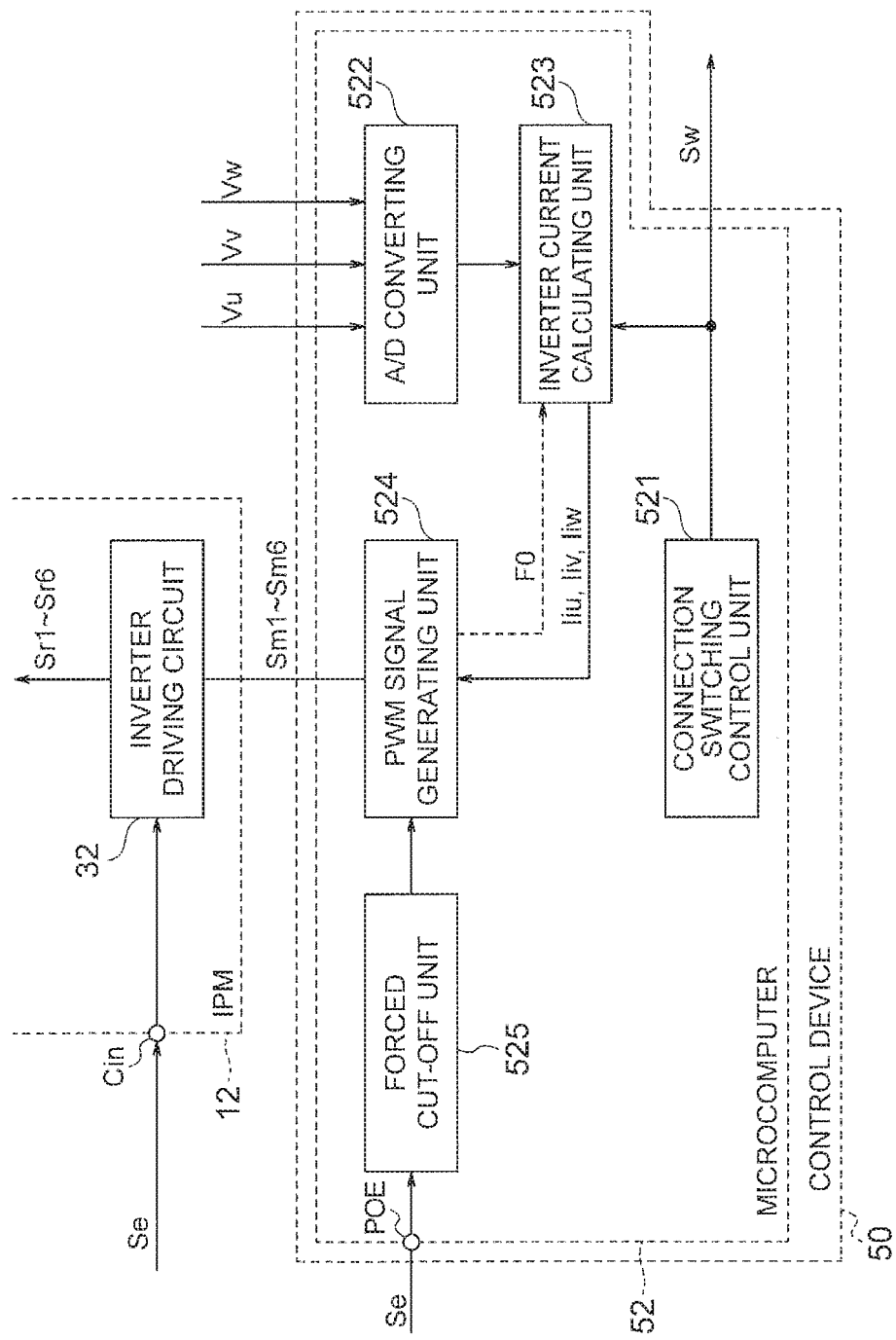
FIG. 3 is a block diagram schematically showing the configuration of the control device in FIG. 1.

As shown in FIG. 3, the microcomputer 52 includes a connection switching control unit 521, an A/D converting unit 522, an inverter current calculating unit 523, a PWM signal generating unit 524, and a forced cut-off unit 525.

The connection switching control unit 521 generates a connection selection signal Sw. This signal Sw designates whether the motor 4 is to be in the star connection state or in the delta connection state.

For example, the connection selection signal Sw is Low when designating the star connection, and High when designating the delta connection.

The connection selection signal Sw is supplied to the connection switching means 40 and is used for control over the state of the selection switches 41*u*, 41*v*, 41*w*. Specifically, when the connection selection signal Sw is Low, the selection switches 41*u*, 41*v*, 41*w* are in a state in which the common contact and the normally-closed contact are connected as shown in FIG. 2, while when the connection selection signal Sw is High, the selection switches 41*u*, 41*v*, 41*w* are in a state in which the common contact and the normally-open contact are connected, i.e., in a state opposite to the state shown in FIG. 2.

The connection selection signal Sw is also supplied to the inverter current calculating unit 523.

The A/D converting unit 522 converts signals indicative of the winding currents detected in the manner described later, into digital signals.

The inverter current calculating unit 523 determines inverter output currents based on the output of the A/D converter 522, and also referring to the connection selection signal Sw.

The PWM signal generating unit 524 outputs the PWM signals Sm1 to Sm6 for performing PWM control over the inverter 30 based on the inverter output currents determined by the inverter current calculating unit 523.

The PWM signals Sm1 to Sm6 are respectively used for on-off control over the switching elements in the six arms of the inverter 30.

The PWM signals Sm1 to Sm6 are maintained in a High state for the periods in which the corresponding switching elements are to be maintained in an on state, and are maintained in a Low state for the periods in which the corresponding switching elements are to be maintained in an off state.

As described above, the inverter driving circuit 32 generates the drive signals Sr1 to Sr6 for turning on or off the switching elements in the six arms of the inverter 30, respectively based on the PWM signals Sm1 to Sm6, and outputs the drive signals Sr1 to Sr6.

The drive signals Sr1 to Sr6 are generated corresponding to the PWM signals Sm1 to Sm6, respectively, and control the corresponding switching elements to be maintained in the on state while the corresponding PWM signals are High, and to be maintained in the off state while the corresponding PWM signals are Low.

The PWM signals Sm1 to Sm6 are of a magnitude (0 to 5V) of a signal level in a logic circuit, whereas the drive signals Sr1 to Sr6 have a magnitude of a voltage level, e.g., 15V, required to control the switching elements.

The inverter driving circuit 32 is connected to an over-current cut-off port Cin of the IPM 12. When a signal is input to the over-current cut-off port Cin (when the signal becomes High), the inverter driving circuit 32 turns off the switching elements in all the arms of the inverter 30.

The forced cut-off unit 525 is connected to an inverter output abnormality cut-off port POE of the microcomputer 52. When a signal is input to the port POE (when the signal becomes High), the forced cut-off unit 525 causes the PWM signal generating unit 524 to stop outputting the PWM signals Sm1 to Sm6. When the PWM signals Sm1 to Sm6 all cease to be input, the inverter driving circuit 32 turns off the switching elements in all the arms of the inverter 30.

When the switching elements are turned off, the inverter 30 ceases to output the AC power (the inverter 30 is turned into a stop state).

The forced cut-off unit 525 is configured of hardware, which operates independently of the control programs executed by the microcomputer 52.

The process of stopping the output of the PWM signals Sm1 to Sm6 from the PWM signal generating unit 524 responsive to the signal to the inverter output abnormality cut-off port POE is performed by the forced cut-off unit 525 configured of hardware, without interaction with the process by software of the microcomputer 52, and can therefore be carried out at a high speed.

The reason why the processes of stopping the inverter 30 are performed in duplicate as described above is to perform the operation at a high speed, and with less possibility of failure.

The current detecting circuit 60 has winding current detecting elements 61u, 61v, 61w.

The winding current detecting elements 61u, 61v, 61w are provided for the windings of the three phases and detect the currents of the corresponding windings, respectively.

For example, each of the winding current detecting elements 61u, 61v, 61w is formed of a current transformer.

For example, the winding current detecting elements 61u, 61v, 61w are provided on the lead lines 44u, 44v, 44w connected to the windings 4u, 4v, 4w of the respective phases. Specifically, the winding current detecting elements 61u, 61v, 61w are provided on the lead lines 44u, 44v, 44w connecting the second ends 4ub, 4vb, 4wb of the windings 4u, 4v, 4w of the respective phases and the common contacts 41uc, 41vc, 41wc of the selection switches 41u, 41v, 41w.

Figure 4:
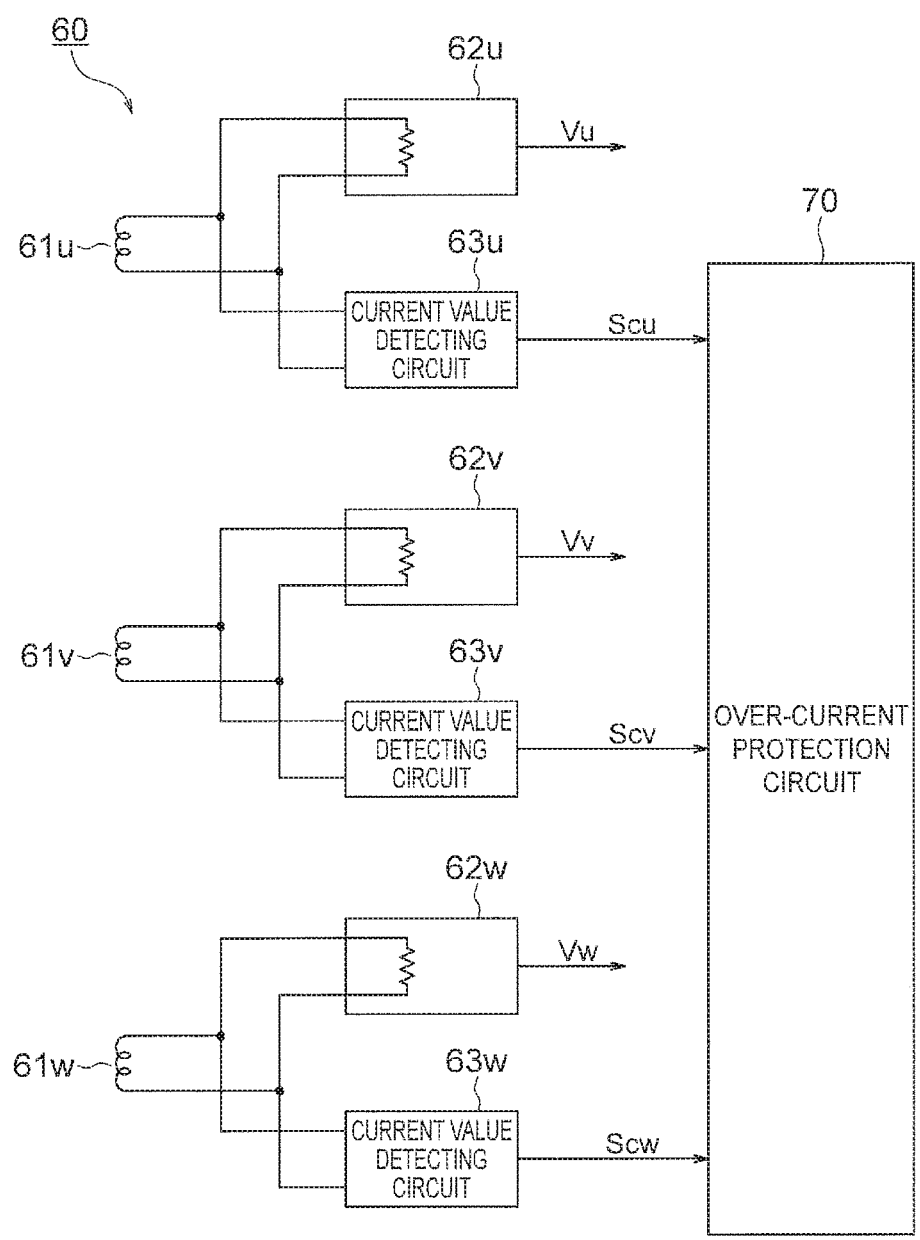
FIG. 4 is a block diagram schematically showing the configuration of the current detecting circuit and the over-current protection circuit in FIG. 1.

In addition to the winding current detecting elements 61u, 61v, 61w, the current detecting circuit 60 shown in FIG. 1, includes signal converting circuits 62u, 62v, 62w and current value detecting circuits 63u, 63v, 63w, as shown in FIG. 4.

The signal converting circuits 62u, 62v, 62w are provided respectively corresponding to the winding current detecting elements 61u, 61v, 61w, and respectively generate analog voltage signals Vu, Vv, Vw corresponding to the currents output from the corresponding winding current detecting elements. Each of the signal converting circuits 62u, 62v, 62w is formed of a resistor allowing flow of the current from the corresponding winding current detecting element. An amplifying circuit or a voltage dividing circuit may be added for level adjustment when required.

The outputs Vu, Vv, Vw of the signal converting circuits 62u, 62v, 62w are input via analog ports of the microcomputer 52 to the A/D converting unit 522 shown in FIG. 3.

The A/D converting unit 522 sequentially selects the outputs Vu, Vv, Vw of the signal converting circuits 62u, 62v, 62w in a time-division manner, and performs A/D conversion. As a result, a time series of data indicative of the sample values of the AC currents respectively detected by the winding current detecting elements 61u, 61v, 61w is output from the A/D converting unit 522.

The sampling period is set so as to be sufficiently short compared with the period of the AC currents output from the inverter 30.

The inverter current calculating unit 523 calculates the inverter output currents Iiu, Iiv, Iiw from the outputs of the A/D converting unit 522. In this calculation, different processes are performed depending on the connection selection signal Sw. The inverter output currents are vector quantities each including an amplitude component and a phase component. This is also true for the winding currents described later.

In the calculation of the inverter output currents Iiu, Iiv, Iiw, the inverter current calculating unit 523 removes the circulating current component. The circulating current is generated when the windings are in the delta connection state.

Figure 5:
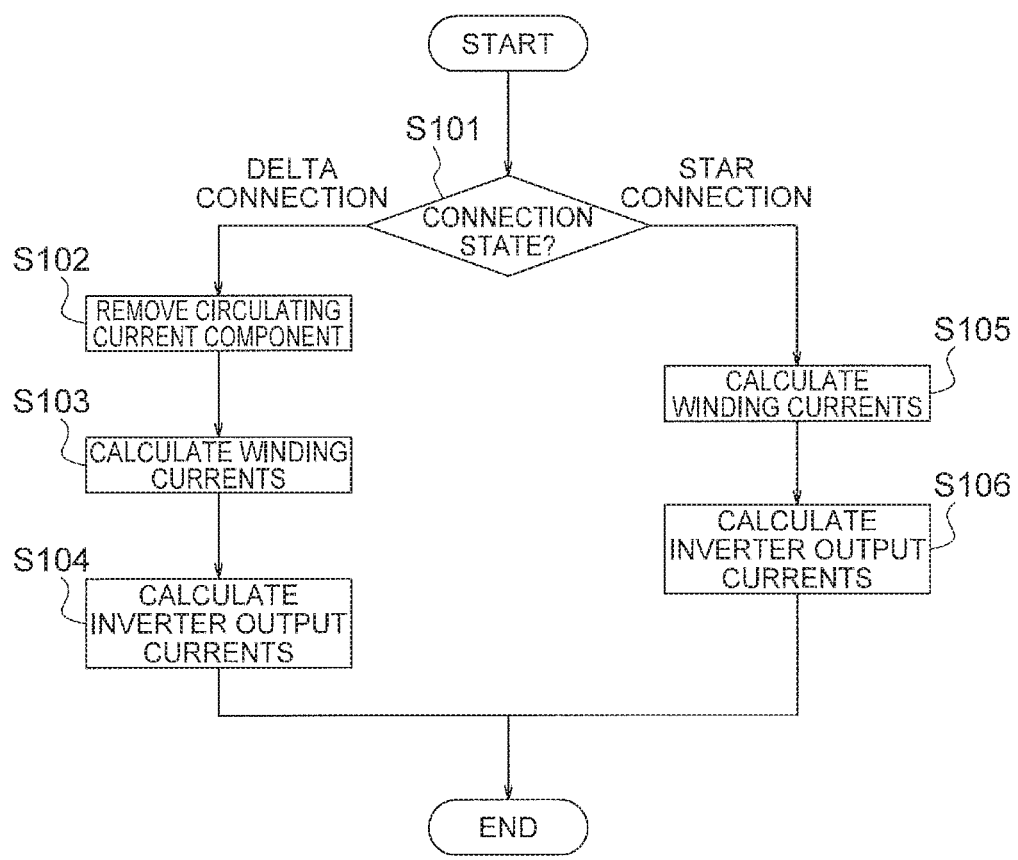
FIG. 5 is a flowchart showing an example of the procedure of the processes in the inverter current calculating unit in FIG. 3.

For example, the inverter current calculating unit 523 calculates the inverter output currents following the procedure shown in FIG. 5.

First, a decision is made as to whether the motor 4 is in the delta connection state or the star connection state (S101). The decision is performed based on the connection selection signal Sw output from the connection switching control unit 521. In the case of the delta connection state, the procedure proceeds to step S102. In the case of the star connection state, the procedure proceeds to step S105.

In step S102, the inverter current calculating unit 523 removes the circulating current component from the time series of data output from the A/D converting unit 522. The removal of the circulating current component is performed by band-pass filtering the output of the A/D converting unit 522 to remove harmonics leaving the fundamental wave only. The frequency F0 of the fundamental wave is notified from the PWM signal generating circuit 524 to the inverter current calculating unit 523 as shown by an arrow of a dotted line in FIG. 3.

The harmonics due to the circulating current component which are particularly problematical are the third harmonic, and the ninth harmonic.

Figure 6:
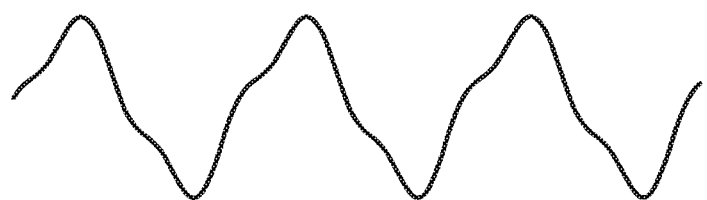
FIGS. 6(a) and 6(b) are waveform diagrams showing the processes for removing the circulating current component in FIG. 5.
Figure 6:
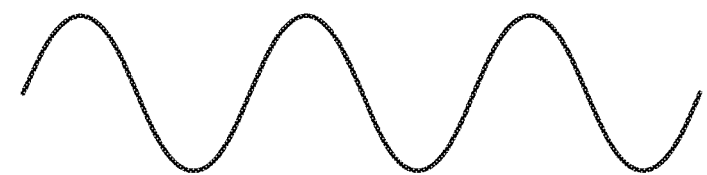

When harmonics due to the circulating current are included in the winding currents, the waveform of the current represented by the time series of data output from the A/D converting unit 522 includes harmonic components as shown in FIG. 6(a), for example. In step S102, the harmonic components are removed to generate a time series of data representing a waveform shown in FIG. 6(b), for example.

In step S103, the inverter current calculating unit 523 calculates the winding currents Imu, Imv, Imw of the three phases based on the time series of data from which the circulating current component has been removed in the process of step S102. The winding current of each phase is defined as the current flowing from the first end to the second end of the winding of the particular phase.

Next, in step S104, the inverter current calculating unit 523 calculates the inverter output currents Iiu, Iiv, Iiw of the three phases based on the winding currents Imu, Imv, Imw calculated in the process of step S103. The inverter output current of each phase is defined as the current which flows from the inverter 30 to the motor 4 through the output line of the particular phase.

The calculations of the inverter currents are performed using the relations of the following equations (1u), (1v), (1w).

$$Iiu = \sqrt{3} \times Imu \times \exp(j\pi/6) \quad (1u)$$

$$Iiv = \sqrt{3} \times Imv \times \exp(j\pi/6) \quad (1v)$$

$$Iiw = \sqrt{3} \times Imw \times \exp(j\pi/6) \quad (1w)$$

In step S105, the inverter current calculating unit 523 calculates the winding currents Imu, Imv, Imw based on the outputs of the A/D converting unit 522.

Subsequently, in step S106, the inverter current calculating unit 523 calculates the inverter output currents Iiu, Iiv, Iiw based on the winding currents Imu, Imv, Imw calculated in step S105. The calculations are performed using the relations of the following equations (2u), (2v), (2w).

$$Iiu = Imu \quad (2u)$$

$$Iiv = Imv \quad (2v)$$

$$Iiw = Imw \quad (2w)$$

The equations (2u), (2v), (2w) show that the winding currents and the inverter output currents are equal at the time of the star connection. Accordingly, the winding currents can be used as the inverter output currents without change.

In the above example, the band-pass filtering is performed in step S102 to remove the circulating current component. Alternatively, the output of the A/D converting unit 522 may be transformed into data in the frequency domain, and the undesired frequency components, e.g., the third harmonic component, and the ninth harmonic component, may be removed, and the resultant data may be transformed back into the data of the time domain (time series of data indicative of the instantaneous values). The transformation into the frequency domain can be performed by FFT, and the transformation into the time domain can be performed by inverse FFT.

Figure 7:
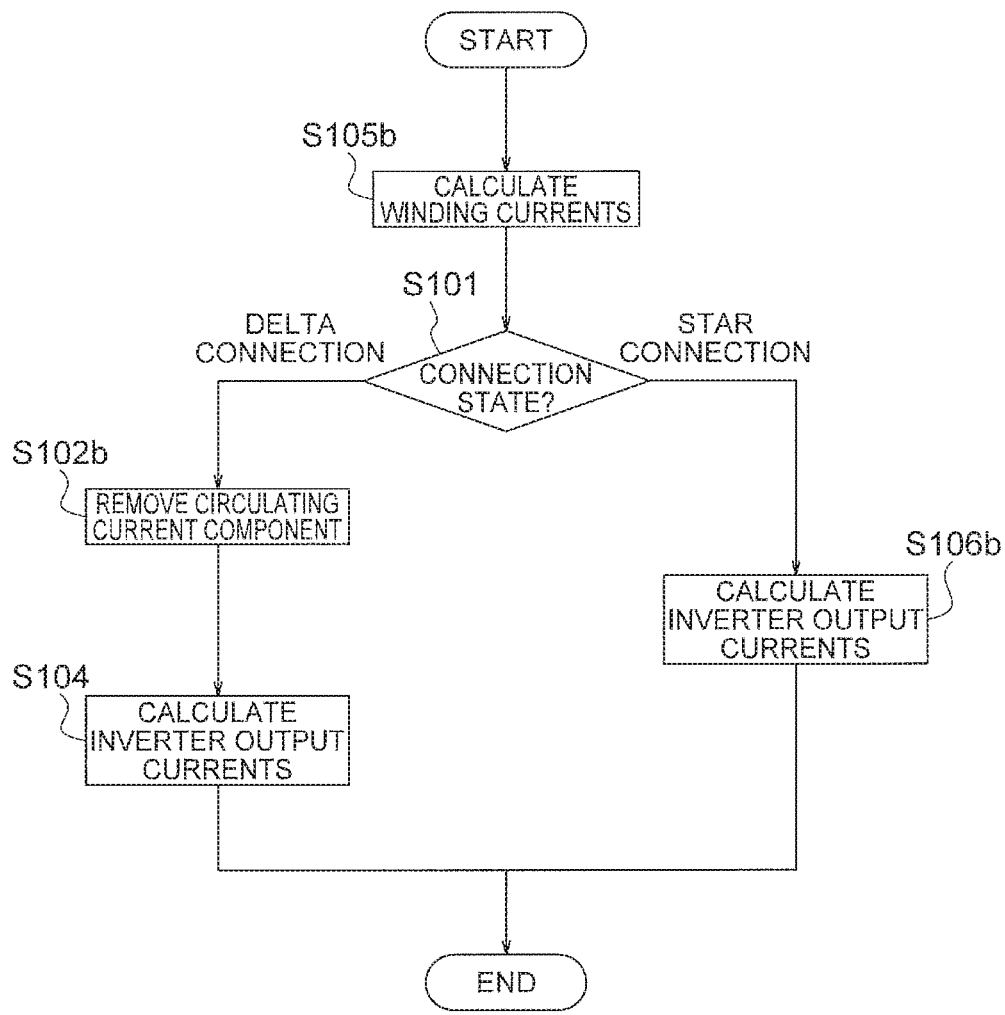
FIG. 7 is a flowchart showing another example of the procedure of the processes in the inverter current calculating unit in FIG. 3.

FIG. 7 shows another example of the procedure of the processes at the inverter current calculating unit 523.

At first, in step S105b, the inverter current calculating unit 523 calculates the winding currents Imud, Imvd, Imwd based on the outputs of the A/D converting unit 522. Here, the winding currents are denoted by Imud, Imvd, Imwd for the purpose of distinction from the winding currents Imu, Imv, Imw from which the circulating current component has been removed, as will be described later.

After step S105b, a decision is made as to whether the motor 4 is in the delta connection state or the star connection state (S101).

In the case of the delta connection state, the procedure proceeds to step S102b. In the case of the star connection state, the procedure proceeds to step S106b.

In step S102b, the circulating current component is removed from the winding currents Imud, Imvd, Imwd calculated in step S105b. The removal of the circulating current component is performed by computations expressed by the following equations (3t) to (3w) on the winding currents Imud, Imvd, Imwd calculated in step S105b.

$$I0 = (Imud + Imvd + Imwd)/3 \quad (3t)$$

$$Imu = Imud - I0 \quad (3u)$$

$$Imv = Imvd - I0 \quad (3v)$$

$$Imw = Imwd - I0 \quad (3w)$$

In the above equations (3u), (3v), (3w), Imu, Imv, Imw respectively denote the winding currents of the U-phase, V-phase, and W-phase free from the circulating current component.

I0 given by the equation (3t) denotes the circulating current component.

The computations expressed by the equations (3t) to (3w) represent the processes of determining one third of the sum (vector sum) of the winding currents Imud, Imvd, Imwd of the U-phase, V-phase, W-phase detected by the winding current detecting elements 61u, 61v, 61w to determine the circulating current component I0, and subtracting the circulating current component I0 from the winding currents Imud, Imvd, Imwd of the U-phase, V-phase, W-phase to determine the winding currents Imu, Imv, Imw free from the circulating current component.

In step S104, the inverter output currents Iiu, Iiv, Iiw are calculated by performing computations of the equations (1u), (1v), (1w) on the winding currents calculated in step S102b, as in step S104 in FIG. 5.

In step S106b, the inverter current calculating unit 523 calculates the inverter output currents Iiu, Iiv, Iiw based on the winding currents Imud, Imvd, Imwd calculated in step S105b. The calculations are performed using the relations of the following equations (4u), (4v), (4w).

$$Iiu = Imud \quad (4u)$$

$$Iiv = Imvd \quad (4v)$$

$$Iiw = Imwd \quad (4w)$$

The equations (4u), (4v), (4w) are similar to the equations (2u), (2v), (2w) but differ in that Imu, Imv, Imw are replaced with Imud, Imvd, Imwd.

The inverter output currents Iiu, Iiv, Iiw calculated by the process shown in FIG. 5 or the process shown in FIG. 7 are supplied as the results of the calculations at the inverter current calculating unit 523, to the PWM signal generating circuit 524.

The PWM signal generating unit 524 uses the inverter output currents Iiu, Iiv, Iiw of the three phases to output the PWM signals Sm1 to Sm6 for performing PWM control over the inverter 30.

The current value detecting circuits 63u, 63v, 63w are respectively connected to the winding current detecting elements 61u, 61v, 61w, and each of the current value detecting circuits 63u, 63v, 63w generates a DC voltage signal indicative of the magnitude of the AC current detected by the corresponding winding current detecting element.

Figure 8:
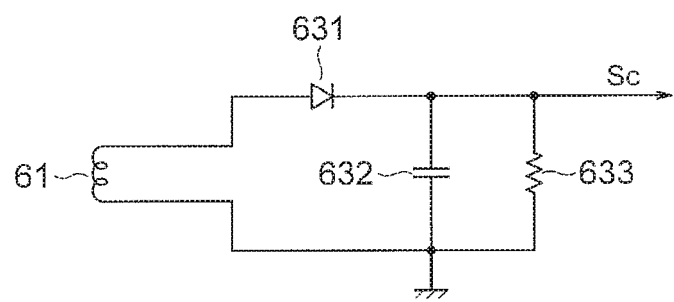
FIG. 8 is a wiring diagram showing the configuration of the current value detecting current in FIG. 4.

For example, each of the current value detecting circuits 63u, 63v, 63w has a diode 631, a capacitor 632 and a resistor 633, as shown in FIG. 8.

The diode 631 rectifies the output of the corresponding winding current detecting element 61 (one of 61u, 61v, 61w in FIG. 4), and its anode is connected to a first output terminal of the corresponding winding current detecting element 61 (a first end of the winding of the current transformer).

The capacitor 632 smoothes the DC current output from the diode 631. A first terminal of the capacitor 632 is connected to a cathode of the diode 631, and a second terminal of the capacitor 632 is connected to a second terminal of the winding current detecting element (second end of the winding of the current transformer), and also to the ground.

The resistor 633 is connected across the two terminals of the capacitor 632, and discharges the electric charge in the capacitor.

The voltage Sc across the two terminals of the capacitor 632 of each of the current value detecting circuits 63u, 63v, 63w is supplied as the output Scu, Scv or Scw of the particular current value detecting circuit (voltage signal indicative of the magnitude of the current) to the over-current protection circuit 70.

Figure 9:
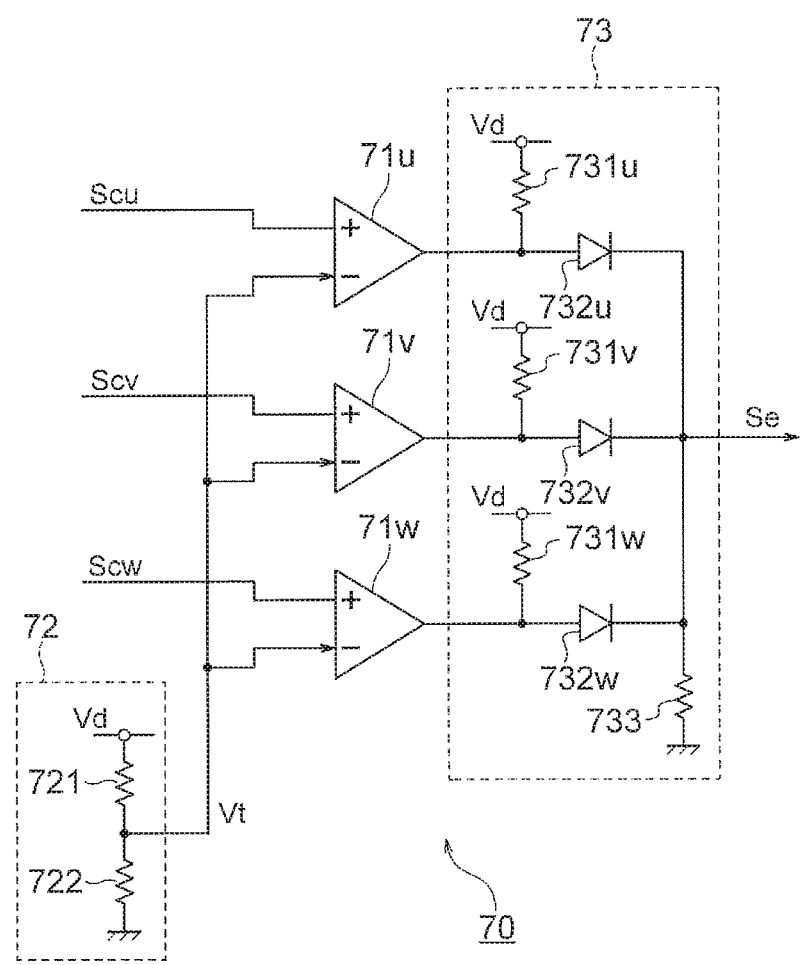
FIG. 9 is a wiring diagram of the over-current protecting circuit 70 in FIG. 1.

As shown in FIG. 9, the over-current protection circuit 70 has comparators 71u, 71v, 71, a threshold value generating circuit 72, and a combining circuit 73.

The outputs of the current value detecting circuits 63u, 63v, 63w are respectively supplied to non-inverted input terminals (plus terminals) of the comparators 71u, 71v, 71w. Supplied to the inverted input terminals (minus terminals) of the comparators 71u, 71v, 71w is a threshold value Vt generated in the threshold value generating circuit 72.

The threshold value generating circuit 72 is formed of a voltage dividing circuit including resistors 721, 722.

A first end of the resistor 721 is connected to the control power source Vd, and a second end of the resistor 721 is connected to a first end of the resistor 722, and a second end of the resistor 722 is connected to the ground.

A voltage Vt dependent on the division ratio of the voltage dividing circuit, i.e., a voltage Vt given by:

$$Vt = Vd \times R722/(R721 + R722) \quad (5)$$

appears at a junction between the second end of the resistor 721 and the first end of the resistor 722, i.e., the voltage division node of the voltage-dividing circuit, and this voltage Vt is supplied as the threshold value to the inverted input terminals of the comparators 71u, 71v, 71w.

An output of the comparator 71u is High when the current value signal Scu is higher than the threshold value Vt; otherwise it is Low.

Similarly, an output of the comparator 71v is High when the current value signal Scv is higher than the threshold value Vt; otherwise it is Low.

Similarly, an output of the comparator 71w is High when the current value signal Scw is higher than the threshold value Vt; otherwise it is Low.

The combining circuit 73 combines the results of the determinations made by the comparators 71u, 71v, 71w.

In the illustrated example, the combining circuit 73 is formed of a diode OR circuit, and when the output of at least one of the comparators 71u, 71v, 71w is High, the output of the combining circuit 73 is High; otherwise the output of the combining circuit 73 is Low.

For example, the combining circuit 73 has resistors 731u, 731v, 731w, diodes 732u, 732v, 732w, and a resistor 733.

First ends of the resistors 731u, 731v, 731w are connected to the control power source Vd, and second ends of the resistors 731u, 731v, 731w are connected to the output terminals of the corresponding comparators 71u, 71v, 71w.

Anodes of the diodes 732u, 732v, 732w are respectively connected to the output terminals of the corresponding comparators 71u, 71v, 71w, and cathodes of the diodes 732u, 732v, 732w are all connected to a first end of the resistor 733.

A second end of the resistor 733 is connected to the ground.

A signal appearing at the first end of the resistor 733 is the output of the combining circuit 73, and accordingly the output of the over-current protection circuit 70.

The output of the over-current protection circuit 70 is supplied to the over-current cut-off port Cin of the IPM 12, and also supplied to the inverter output abnormality cut-off port POE of the microcomputer 52.

When a signal is supplied to the over-current cut-off port Cin of the IPM 12 (when the signal becomes High), the inverter driving circuit 32 causes the switching elements in all the arms of the inverter 30 to be turned off.

Also, when a signal is supplied to the inverter output abnormality cut-off port POE of the microcomputer 52 (when the signal becomes High), the PWM signal generating unit 524 ceases to output the PWM signals Sm1 to Sm6, by the action of the forced cut-off unit 525, and accordingly, no PWM signals are supplied to the inverter driving circuit 32. As a result, the inverter driving circuit 32 causes the switching elements in all the arms of the inverter 30 to be off.

When the switching elements in the respective arms of the inverter 30 are off, the inverter 30 is in a state (stop state) in which no AC power is output.

As has been described, when the output of the combining circuit 66 becomes High, the processes of stopping the inverter are performed in duplicate.

Variation

In the first embodiment described above, the combining circuit 73 is formed of a diode OR circuit; but an OR circuit configured by combining transistors, e.g., MOS transistors, may be used.

As has been described, according to the present embodiment, the winding currents of the motor, rather than the inverter currents, are detected, so that it is possible to accurately detect the winding currents, not only at the time of the star connection, but also at the time of the delta connection. Accordingly, demagnetization of the permanent magnets can be prevented and the motor can be made to operate to the limit of its capacity.

Also, the inverter output currents are calculated after removing the circulating current component from the detected winding currents, and the inverter output currents calculated in this way are used for the PWM control, so that the PWM control can be performed with a high accuracy.

Second Embodiment

Figure 10:
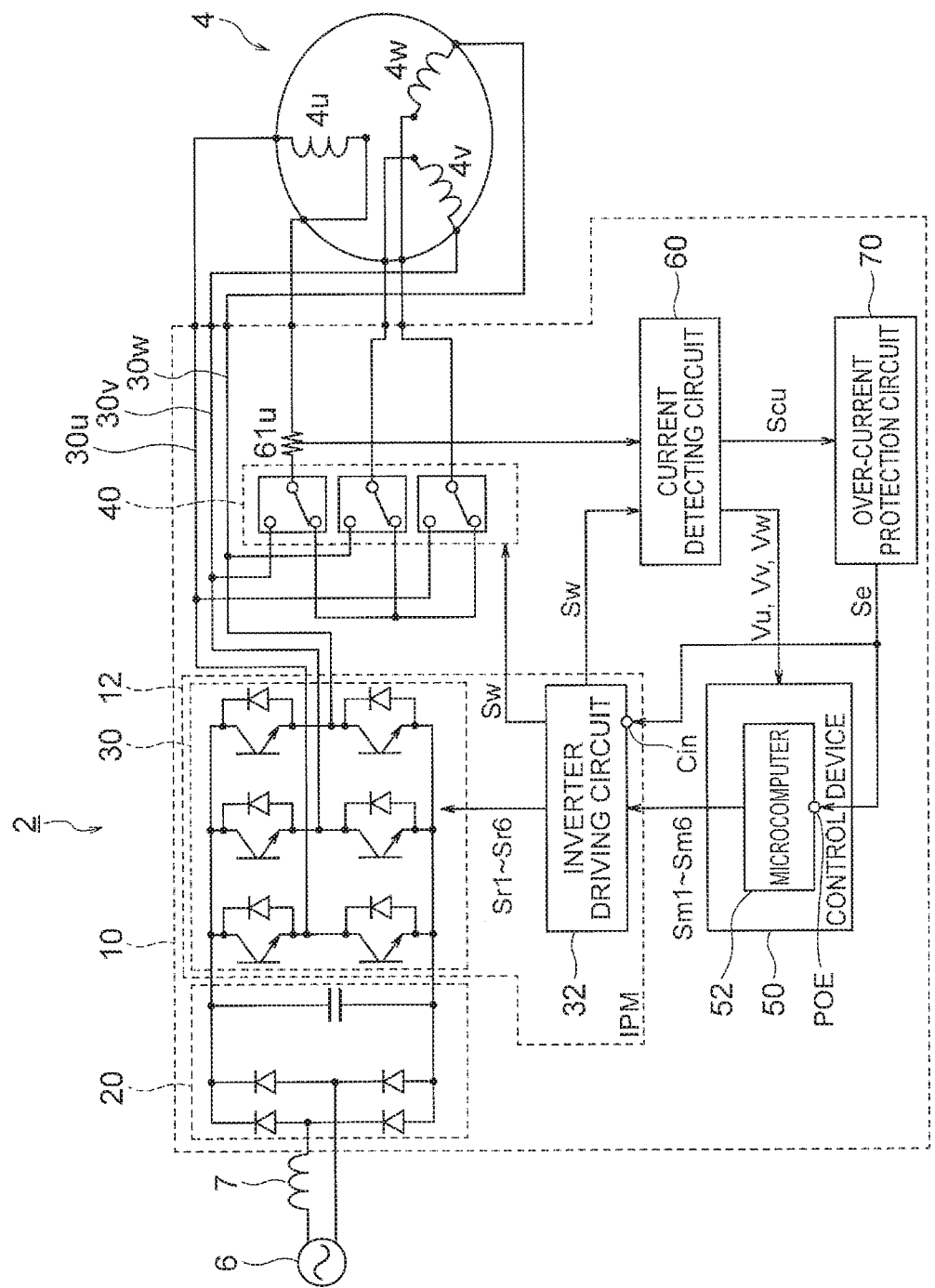
FIG. 10 is a schematic wiring diagram showing a motor driving apparatus of a second embodiment of the present invention, together with a motor.

In the first embodiment, the winding current detecting elements 61u, 61v, 61w are provided respectively for the windings of the three phases. However, the winding current detecting elements may be provided only for one or two phases. An example of configuration of such a case is shown in FIG. 10. In the illustrated example, the winding current detecting element 61u is provided only for one of the three phases, specifically the U-phase.

In this case, the removal of the circulating current component can be performed by filtering in the same manner as that described with reference to FIG. 5. Alternatively, the transformation into the frequency domain, the removal of the undesired frequency component, and the transformation back into the time domain may be used, as is also described above.

Also, the inverter current calculating unit 523 estimates, from the inverter output current of one phase, the inverter output currents of other phases. For example, a current which lags by $2\pi/3$ behind the inverter output current of one phase, and a current which lags by $4\pi/3$ behind the inverter output current of the above-mentioned one phase may be estimated as the currents of the two other phases.

Also, the over-current protection circuit 70 determines whether the current is excessive based on the winding current of one phase only. In this case, only one of the comparators 71u, 71v, 71w is used, and the combining circuit 73 is unnecessary.

Third Embodiment

Figure 11:
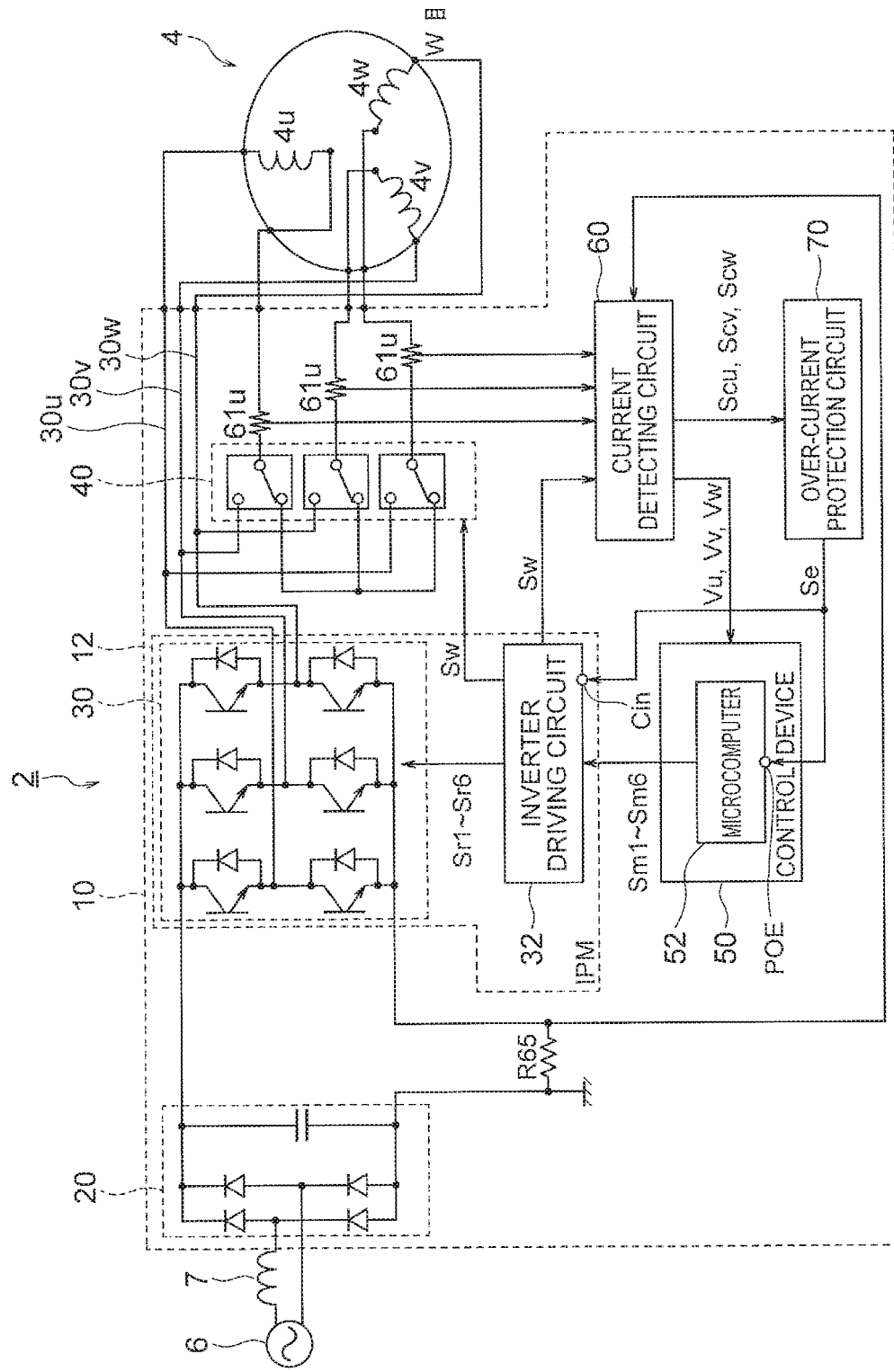
FIG. 11 is a schematic wiring diagram showing a motor driving apparatus of a third embodiment of the present invention, together with a motor.

In the configuration of the first embodiment shown in FIG. 1, the over-current protection of the windings is performed by detecting the winding currents. Alternatively, an input current of the inverter (bus current) may also be detected as shown in FIG. 11.

The detection of the bus current may be performed by measuring a voltage drop across a resistor R65 inserted in the bus line.

In this case, the value of the detected bus current may also be used for the over-current protection.

The value of the detected bus current can also be used for protection against short-circuiting of the arms of the inverter 30. The detection of the bus current enables realization of a system with high reliability.

Forth Embodiment

In the configurations shown in FIG. 1, FIG. 10, FIG. 11, the connection switching means 40 is formed of selection switches. Alternatively, the connection switching means may be formed of combinations of a normally-closed switch and a normally-open switch. An example of such a configuration is shown in FIG. 12.

Figure 12:
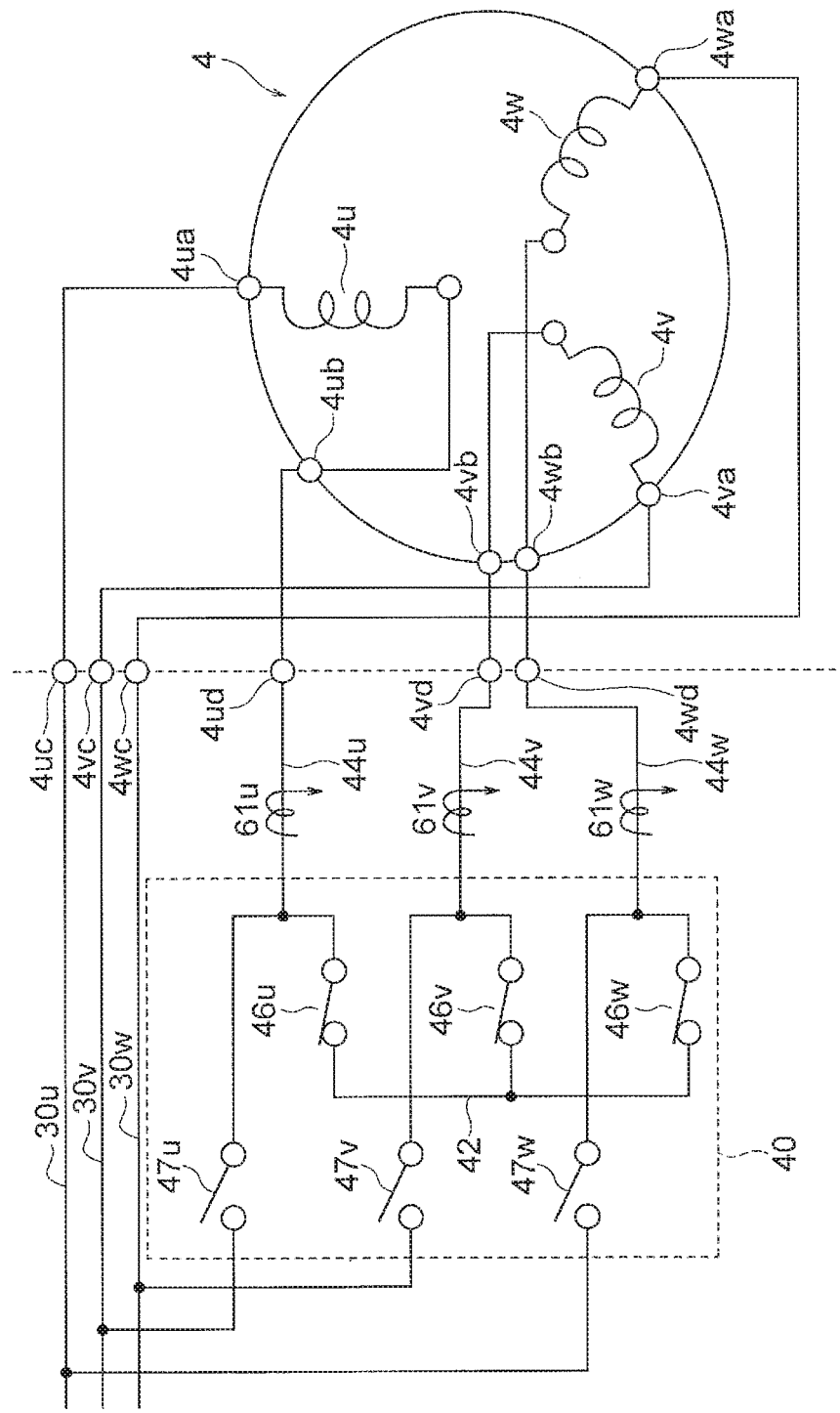
FIG. 12 is a wiring diagram showing in further detail the windings of the motor and the connection switching means in a fourth embodiment of the present invention.

In the configuration shown in FIG. 12, the selection switch 41u is replaced with a combination of a normally-closed switch 46u and a normally-open switch 47u, the selection switch 41v is replaced with a combination of a normally-closed switch 46v and a normally-open switch 47v, and the selection switch 41w is replaced with a combination of a normally-closed switch 46w and a normally-open switch 47w.

In the illustrated state in which the normally-closed switches 46u, 46v, 46w are closed (are on), and the normally-open switches 47u, 47v, 47w are open (are off), the motor is star-connected. In a state opposite to the illustrated state, in which the normally-closed switches 46u, 46v, 46w are open, and the normally-open switches 47u, 47v, 47w are closed, the motor is delta-connected.

It is desirable that the switches used in the connection switching means 40 have a smaller on-time conduction loss, and mechanical switches such as relays and contactors are suitable.

However, when combinations of a normally-closed switch and a normally-open switch are used as shown in FIG. 12, a WBG semiconductor such as SiC or GaN may be used. They have low on-resistance and low loss, and their element heat generation is small. They can also perform high-speed switching. Accordingly, for switching the connection state while the motor is operated, it is desirable that the switches be formed of a semiconductor.

Where the motor is used to drive a compressor of an air-conditioner, and combinations of a normally-closed switch and a normally-open switch are used as shown in FIG. 12, it is desirable that the switches which are on when the connection state (e.g. the star connection state) assumed when the compressor load is low is selected, be normally-on-type semiconductor switches. This is because, by such an arrangement, the loss at the time of low load can be reduced, and the overall efficiency is high in the case of a motor used for driving a compressor of an air conditioner with which the proportion of the low-load operation in the entire operation time is high.

The invention claimed is:

1. A motor driving apparatus comprising:
    a connection switching means for switching a connection state of windings of a motor between a star connection state and a delta connection state;
    an inverter for supplying said motor with AC power, to cause said motor to operate;
    a control device for causing said connection switching means to make switching of the connection state, and controlling said inverter; and
    one or more winding current detecting elements respectively provided for one or more of said windings, each of the winding current detecting elements detecting a current flowing through the corresponding winding;
    an over-current protection circuit for causing said inverter to stop when the currents detected by said winding current detecting elements become excessive;
    wherein said control device calculates output currents of said inverter after removing a circulating current component at a time of the delta connection, from the winding currents detected by said winding current detecting elements, and performing control over said inverter using the calculated inverter output currents of said inverter.

2. The motor driving apparatus as set forth in claim 1, wherein
    said control device removes the circulating current component by band-pass filtering the currents detected by said winding current detecting elements.

3. The motor driving apparatus as set forth in claim 1, wherein
    said winding current detecting elements are provided respectively for the windings of the three phases; and
    said control device removes the circulating current component by subtracting one third of a vector sum of the currents of the three windings detected by the winding current detecting elements respectively provided for the three phases, from the currents of the three windings.

4. The motor driving apparatus as set forth in claim 3, wherein
    said over-current protection circuit comprises:
    a first to third comparators respectively provided for said windings, each of said comparators determining whether the current detected by the corresponding winding current detecting element has become larger than a threshold value;
    a combining circuit for combining results of determinations by said first to third comparators.

5. The motor driving apparatus as set forth in claim 4, wherein
    said combining circuit comprises an OR circuit which takes a logical sum of the results of the determinations by said first to third comparators.

6. The motor driving apparatus as set forth in claim 4, wherein
    the threshold value used at the time of the star connection and the threshold value used at the time of the delta connection are identical.

7. The motor driving apparatus as set forth in claim 1, further comprising a bus current detecting element for detecting a current on an input side of said inverter.

8. The motor driving apparatus as set forth in claim 7, wherein said control device performs protection against arm short-circuiting of the inverter based on the bus current detected by said bus current detecting element.

9. The motor driving apparatus as set forth in claim 1, wherein switching elements of said connection switching means are formed of semiconductor elements.

10. The motor driving apparatus as set forth in claim 9, wherein WBG semiconductor elements are used as said semiconductor elements.

* * * * *